(12) United States Patent
Allen

(10) Patent No.: US 11,568,060 B2
(45) Date of Patent: Jan. 31, 2023

(54) MODULAR TAINT ANALYSIS WITH ACCESS PATHS

(71) Applicant: Oracle International Corporation, Redwood Shores, CA (US)

(72) Inventor: Nicholas John Allen, Westlake (AU)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 17/115,574

(22) Filed: Dec. 8, 2020

(65) Prior Publication Data

US 2022/0179965 A1  Jun. 9, 2022

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ... G06F 21/577; G06F 2221/033; G06F 21/14
See application file for complete search history.

(56) References Cited

U.S. PATENT DOCUMENTS

| 2003/0056192 A1* | 3/2003 | Burgess | G06F 8/75 717/100 |
| 2005/0015752 A1* | 1/2005 | Alpern | G06F 11/3604 717/131 |
| 2013/0167241 A1* | 6/2013 | Siman | G06F 16/245 726/25 |
| 2014/0130153 A1* | 5/2014 | Dolby | H04L 63/1408 726/22 |
| 2014/0237604 A1* | 8/2014 | Guarnieri | G06F 21/577 726/25 |
| 2015/0067834 A1* | 3/2015 | Pistoia | G06F 8/433 726/22 |
| 2017/0351595 A1* | 12/2017 | Li | G06F 11/362 |

(Continued)

OTHER PUBLICATIONS

Lerch et al.—Access-Path Abstraction: Scaling Field-Sensitive Data-Flow Analysis With Unbounded Access Paths, 2015 30th IEEE/ACM International Conference on Automated Software Engineering (ASE) (Year: 2015).*

(Continued)

*Primary Examiner* — Meng Li
(74) *Attorney, Agent, or Firm* — Ferguson Braswell Fraser Kubasta PC

(57) ABSTRACT

A method may include extracting, from an instruction of a function in source code, (i) a left-hand side (LHS) access path including a first variable and a first sequence of fields and (ii) a right-hand side (RHS) access path including a second variable and a second sequence of fields, determining, using an incoming access path, an outgoing access path for the instruction, determining that the incoming access path subsumes the LHS access path, generating a specialized outgoing access path by appending a field of the LHS access path to the outgoing access path, determining, using the specialized outgoing access path, that an entry access path of the function is reachable from an exit access path of the function, in response to determining that the entry access path is reachable from the exit access path, identifying a potential taint flow from the entry access path to the exit access path.

20 Claims, 9 Drawing Sheets

(56) References Cited

U.S. PATENT DOCUMENTS

2021/0279338 A1* 9/2021 Bowman .............. G06F 21/577

OTHER PUBLICATIONS

Bush, William R. et al., "A static analyzer for finding dynamic programming errors"; Software-Practice and Experience; vol. 30; Issue 7; pp. 775-802; Jun. 2000 (28 pages).

Cousot, Patrick et al., "Modular Static Program Analysis"; CC '02: Proceedings of the 11th International Conference on Compiler Construction; Complier Construction; LNCS, vol. 2304; pp. 159-179; Apr. 2002 (21 pages).

Cifuentes, Cristina et al., "Transitioning Parfait into a Development Tool"; IEEE Computer and Reliability Societies; IEEE Security and Privacy; vol. 10; Issue 3; pp. 16-23; May-Jun. 2012 (8 pages).

Distefano, Dino et al., "Scaling Static Analyses at Facebook"; Communication of the ACM; vol. 62, Issue 8; pp. 62-70; Aug. 2019 (9 pages).

Goubault, Eric et al., "Modular Static Analysis with Zonotopes"; SAS 2012: Proceedings of the 19th International Static Analysis Symposium; Static Analysis; LNCS, vol. 7460; pp. 24-40; Sep. 2012 (17 pages).

Huang, Wei et al., "Type-Based Taint Analysis for Java Web Applications"; FASE 2014: Proceedings of the 17th International Conference on Fundamental Approaches to Software Engineering; Fundamental Approaches to Software Engineering; LNCS, vol. 8411; pp. 140-154; Apr. 2014 (15 pages).

Moy, Yannick et al., "Modular Bug-finding for Integer Overflows in the Large: Sound, Efficient, Bit-precise Static Analysis"; <https://www.microsoft.com/en-us/research/wp-content/uploads/2016/02/z3prefix.pdf>; May 2009 (26 pages).

Szabó, Tamás et al., "IncA: A DSL for the Definition of Incremental Program Analyses"; ASE 2016: Proceedings of the 31st IEEE/ACM International Conference on Automated Software Engineering; pp. 320-331; Aug. 2016 (12 pages).

Stiévenart, Quentin et al., "SCALA-AM: A Modular Static Analysis Framework"; 2016 IEEE 16th International Working Conference on Source Code Analysis and Manipulation (SCAM); pp. 85-90; Oct. 2-3, 2016 (6 pages).

Tiwari, Abhishek et al., "UFA: Modular Inter-app Intent Information Flow Analysis of Android Applications" Conference: SecureComm 2019—15th EAI International Conference on Security and Privacy in Communication Networks; Oct. 2019 (14 pages).

Shang, Lei et al., "Fast and precise points-to analysis with incremental CFL-reachability summarisation: preliminary experience"; ASE 2012: Proceedings of the 27th IEEE/ACM International Conference on Automated Software Engineering; pp. 270-273; Sep. 2012 (4 pages).

* cited by examiner

MODULAR TAINT ANALYSIS WITH ACCESS PATHS

CROSS-REFERENCE TO RELATED APPLICATIONS

This application is related to: U.S. patent application Ser. No. 16/050,160 (now U.S. Pat. No. 10,789,362), filed Jul. 31, 2018, entitled "TAINT ANALYSIS WITH ACCESS PATHS" for the purposes of disclosure material depending on the subject matter disclosed.

BACKGROUND

Static taint analysis has been demonstrated as an effective means of detecting injection vulnerabilities in programs. Modular program analysis involves performing separate analysis of components of a program, and combining the results to achieve an analysis of the entire program as a whole. Benefits of modular analysis include:

1) Efficient program analysis with reduced memory usage due to not having to load the entire program at once, while allowing parallel analysis of independent components;

2) Separate analysis of a library such that the library summary may be computed in advance, and later used in the analysis of programs that use the library; and 3) Incremental analysis, where an updated version of the program is analyzed efficiently by reusing previously-computed summaries from a prior version of the code for components not impacted by the changes made between versions.

Previous work presented a taint analysis using access paths to reason about taint flows through the memory heap, which was applied for the purpose of detecting security vulnerabilities, such as SQL injections, cross-site-scripting, etc. However, the previous work did not support modular analysis, for example, because a function was summarized in the specific context of an analysis of a caller function.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including extracting, from an instruction of a function in source code, (i) a left-hand side (LHS) access path including a first variable and a first sequence of fields and (ii) a right-hand side (RHS) access path including a second variable and a second sequence of fields, determining, using an incoming access path, an outgoing access path for the instruction, determining that the incoming access path subsumes the LHS access path, in response to determining that the incoming access path subsumes the LHS access path, generating a specialized outgoing access path by appending a field of the LHS access path to the outgoing access path, determining, using the specialized outgoing access path, that an entry access path of the function is reachable from an exit access path of the function, and in response to determining that the entry access path is reachable from the exit access path, identifying a potential taint flow from the entry access path to the exit access path.

In general, in one aspect, one or more embodiments relate to a system including a computer processor, a repository configured to store source code including a function, wherein the function includes an instruction including (i) a left-hand side (LHS) access path comprising a first variable and a first sequence of fields and (ii) a right-hand side (RHS) access path comprising a second variable and a second sequence of fields. The system further includes an access path engine, executing on the computer processor and configured to extract, from the instruction the LHS access path and the RHS access path, determine, using an incoming access path, an outgoing access path for the instruction, determine that the incoming access path subsumes the LHS access path, in response to determining that the incoming access path subsumes the LHS access path, generate a specialized outgoing access path by appending a field of the LHS access path to the outgoing access path, determine, using the specialized outgoing access path, that an entry access path of the function is reachable from an exit access path of the function, and in response to determining that the entry access path is reachable from the exit access path, identify a potential taint flow from the entry access path to the exit access path.

In general, in one aspect, one or more embodiments relate to a method for including obtaining a function from source code, and sending the function to an access path engine configured to identify a potential taint flow by extracting, from an instruction of the function, (i) a left-hand side (LHS) access path including a first variable and a first sequence of fields and (ii) a right-hand side (RHS) access path including a second variable and a second sequence of fields, determining, using an incoming access path, an outgoing access path for the instruction, determining that the incoming access path subsumes the LHS access path, in response to determining that the incoming access path subsumes the LHS access path, generating a specialized outgoing access path by appending a field of the LHS access path to the outgoing access path, determining, using the specialized outgoing access path, that an entry access path of the function is reachable from an exit access path of the function, and in response to determining that the entry access path is reachable from the exit access path, identifying a potential taint flow from the entry access path to the exit access path. The method further includes receiving, from the access path engine, the potential taint flow.

Other aspects of the invention will be apparent from the following description and the appended claims.

DETAILED DESCRIPTION

Figure 1A:
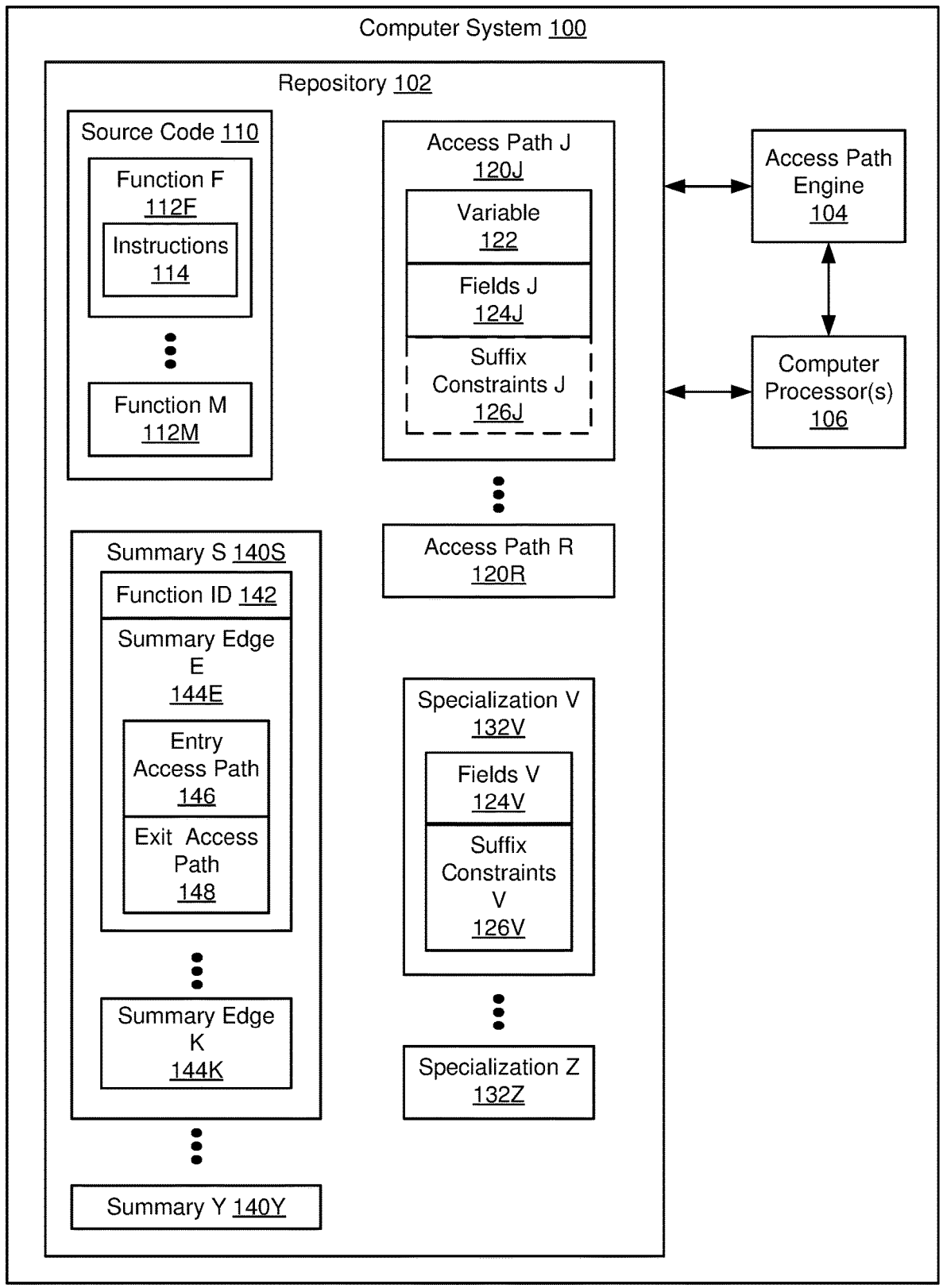
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to performing a modular taint analysis with access paths. An access path may include a variable, a sequence of initial fields, and specializations. Field specializations may append additional fields as a suffix of the initial fields. Constraint specializations may indicate fields to be excluded from the suffix of the access path. A summary may be generated for a function that describes the behavior of the function in terms of summary edges that map between exit access paths of the function and entry access paths of the function. For example, an entry access path may correspond to external input received by the function, and an exit access path may correspond to a return value of the function.

The summary may be generated by processing instructions of the function in a backward manner starting with an exit access path, while propagating access paths transformed by the instructions, in an attempt to reach entry access paths of the function. The summary represents the generalized behavior of the function independent of which other functions may call the function. When an invocation of the function is encountered at a callsite in a calling function, the effect of the called function on the access paths propagated through the calling function may be obtained by instantiating the summary and comparing the level of detail of the access paths of both the calling function and the called function. When an access path of the calling function subsumes (i.e., is more general than) an access path of the called function, one or more specializations may be applied to the access path of the calling function. Similarly, when an access path of the called function subsumes an access path of the calling function, one or more specializations may be applied to the access path of the called function.

FIG. 1A shows a computer system (100) in accordance with one or more embodiments of the invention. As shown in FIG. 1A, the computer system (100) includes a repository (102), an access path engine (104), and computer processor(s) (106). In one or more embodiments, the computer system (100) takes the form of the computing system (500) described with respect to FIG. 5A and the accompanying description below or take the form of the client device (526) described with respect to FIG. 5B.

In one or more embodiments, the repository (102) is any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site. The repository (106) may be accessed online via a cloud service (e.g., Amazon Web Services, Egnyte, Azure, etc.).

In one or more embodiments, the repository (102) includes functionality to store source code (110), access paths (120J, 120R), specializations (132V, 132Z), and summaries (140S, 140Y). The source code (110) is a collection of computer statements (e.g., instructions (114)) written in a human-readable programming language, or intermediate representation (e.g., byte code). The source code (104) may include functions (112A, 112M). In one or more embodiments, a function (112A) is a portion of the source code (104). A function (112A) may include functionality to produce outputs (e.g., return values) using inputs. Examples of functions (112A, 112M) include methods, procedures, etc. A function (112A) may include instructions (114). An instruction (114) may include one or more callsites. A callsite may be a location where a second function is called (e.g., invoked). The function that includes the callsite may be referred to as the caller function, and the called function may be referred to as the callee function or called function.

An access path (120J) includes a variable (122) and fields (124J). For example, an access path (120J) may be written as $b.f_1.f_2 \ldots f_n.*$, where b is the variable (122) and the sequence of fields $f_1.f_2 \ldots f_n$, are the fields (124J). The wildcard symbol '*' represents a suffix of any length (e.g., a suffix that includes any number of additional fields). The variable (122) may identify an instance of an object of the source code (110). The fields (124J) of the access path (120J) may identify and/or access data within the object starting from the variable (122). A prefix of an access path (120J) includes the variable (122) and a subset of the fields (124J) of the access path (120J). Continuing the example above, $b.f_1.f_2$ is a prefix of the access path $b.f_1.f_2 \ldots f_n.*$.

Optionally, an access path (120J) further includes a set of suffix constraints (126J). Each suffix constraint (126J) is a sequence of one or more fields to be excluded from the access path (120J) when applying a specialization to the access path (120J), as described below.

Specializations (132V, 132Z) represent operations that may be applied to transform an access path (120J) into another access path. A specialization (132V) may include a sequence of fields (124V) to be appended as a suffix to the fields (124J) of the access path (120J). Appending the sequence of fields (124V) as a suffix to the fields (124J) of the access path (120J) may modify the suffix constraints (126J) of the access path, if any exist. Alternatively or additionally, a specialization (132V) may include a set of suffix constraints (126V). The set of suffix constraints (126V) may be added to the set of suffix constraints (126J) of the access path (120J) after appending the sequence of fields (124V) of the specialization (132V) to the fields (124J) of the access path (120J). A specialization (132V) that appends a sequence of fields (124V) may be written as [+ sequence of fields]. Continuing the example above, the specialization $[+g_1.g_2]$ that appends the fields $g_1.g_2$ may be applied to the access path $b.f_1.f_2 \ldots f_n.*$ resulting in the access path $b.f_1.f_2 \ldots f_n.g_1.g_2.*$.

A specialization (132V) that adds suffix constraints (126V) may be written as [+\{set of suffix constraints\}]. Further continuing the example above, the specialization $[+\backslash\{h_1,h_2\}]$ that excludes the fields $h_1$ and $h_2$ may be applied to the access path $b.f_1.f_2 \ldots f_n.*$ resulting in the access path $b.f_1.f_2 \ldots f_n.* [+\backslash\{h_1,h_2\}]$. The access path $b.f_1.f_2 \ldots f_n.* [+\backslash\{h_1,h_2\}]$ represents access paths beginning with $b.f_1.f_2 \ldots f_n$, except those access paths beginning with $b.f_1.f_2 \ldots f_n.h_1$ or $b.f_1.f_2 \ldots f_n.h_2$. In one or more embodiments, applying a specialization (132V) to an access path (120J) that adds a field that is excluded by a suffix constraint (126J) of the access path (120J) results in an impossible specialization, in which case the analysis may fail to generate a new access path, resulting in no further processing of the currently propagated access path.

Figure 1B:
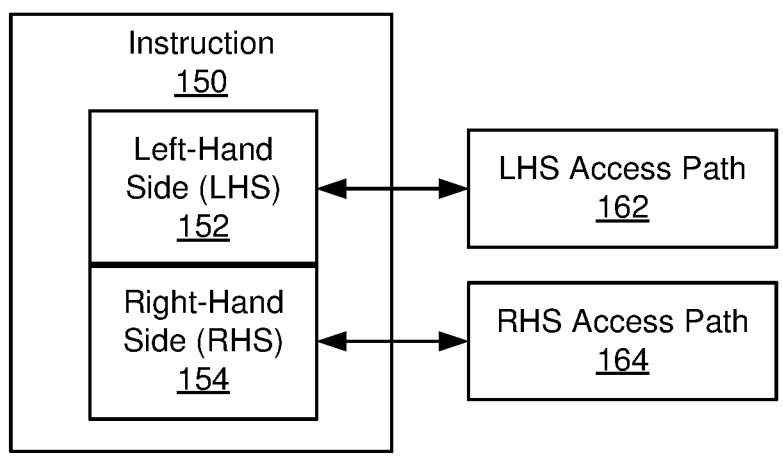

Turning to FIG. 1B, an instruction (150) may include a left-hand side (LHS) (152) and a right-hand side (RHS) (154). The LHS (152) may be a portion of the instruction (150) to the left of a symbol. Similarly, the RHS (154) may be a portion of the instruction (150) to the right of the symbol. For example, the symbol may be an equal sign '='.

Examples of instructions may include:
1) allocation of a new value to a variable (e.g., variable x), which may be written as x=new, where the LHS is 'x' and the RHS is 'new';
2) assignment of a value (e.g., value y), to a variable, which may be written as x=y, where the LHS is 'x' and the RHS is 'y';
3) assignment of a tainted value to a variable, which may be written as x=taintSource( ), where the LHS is 'x' and the RHS is 'taintSource( )';
4) loading a value from a field (e.g., field g), of an object (e.g., object y), which may be written as x=y.g, where the LHS is 'x' and the RHS is 'y.g'; and
5) storing a value into a field of an object, which may be written as x.g=y, where the LHS is 'x.g' and the RHS is 'y'.

In one or more embodiments, the LHS (152) corresponds to a LHS access path (162). Similarly, the RHS (154) may correspond to a RHS access path (164). The LHS access path (162) may reference a location in a memory of a computer system. The RHS access path (164) may correspond to a value to be associated with (e.g., assigned to) the location referenced by the LHS access path (162).

Returning to FIG. 1A, a summary (140S) is a description of the behavior of a function (112A). A summary (140S) includes a function identifier (ID) (142) and summary edges (144E, 144K). The function ID (142) may be an identifier (e.g., a name or unique identifier) corresponding to the function (112A). A summary edge (144E) represents a mapping between an entry access path (146) and an exit access path (148). The entry access path (146) may correspond to an entry point of the function (112A). For example, the entry point may be an instruction that receives input external to the function (112A) or a global variable whose value is accessed by the function (112A). The exit access path (148) may correspond to an exit point of the function (112A). For example, the exit point may be a return value of the function (112A) or a global variable whose value is set or modified by the function (112A). A summary edge (144E) may be written as (exit access path←entry access path). For example, an edge that maps the entry access path x.* to the exit access path this.x.* may be written as (this.x.*←x.*).

When a potentially tainted value (e.g., corresponding to an access path) flows from an entry point of the function (112A) to an exit point of the function (112A), then a potential taint flow exists between the entry point of the function (112A) and the exit point of the function (112A).

The access path engine (104) includes functionality to generate a summary (140S) for a function (112F). The access path engine (104) includes functionality to extract a LHS access path (162) and/or a RHS access path (164) from an instruction (150). The access path engine (104) includes functionality to determine an outgoing access path for an instruction using an incoming access path for the instruction. The access path engine (104) includes functionality to determine whether one access path subsumes another access path.

In one or more embodiments, the computer processor(s) (106) takes the form of the computer processor(s) (502) described with respect to FIG. 5A and the accompanying description below. In one or more embodiments, the computer processor (106) includes functionality to execute the access path engine (104).

While FIG. 1A and FIG. 1B show a configuration of components, other configurations may be used without departing from the scope of the invention. For example, various components may be combined to create a single component. As another example, the functionality performed by a single component may be performed by two or more components.

Figure 2A:
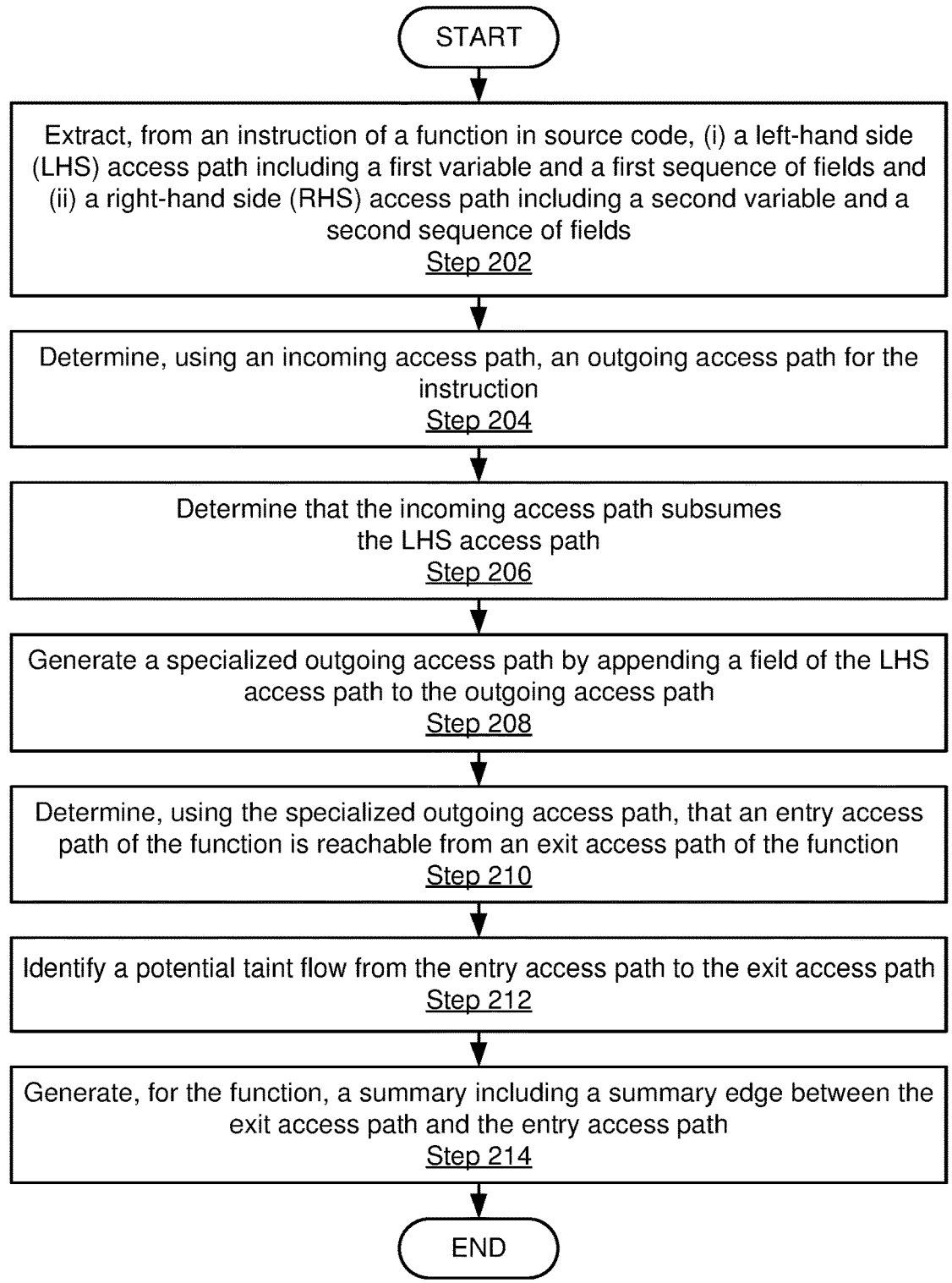
FIG. 2A, FIG. 2B, and FIG. 3 show flowcharts in accordance with one or more embodiments of the invention.

FIG. 2A shows a flowchart in accordance with one or more embodiments of the invention. The flowchart depicts a process for performing a modular taint analysis with access paths. One or more of the steps in FIG. 2A may be performed by the components (e.g., the access path engine (104) of the system (100)), discussed above in reference to FIG. 1A. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 202, a left-hand side (LHS) access path and a right-hand side (RHS) access path am extracted from an instruction of a function in source code. Both the LHS access path and the RHS access path include a variable and a sequence of fields. In one or more embodiments, the instruction is a store instruction of the form x.g=y, where the left-hand side (LHS) of the instruction is x.g and the right-hand side (RHS) of the instruction is y. The LHS access path may correspond to x.g and the RHS access path may correspond to y. The LHS access path may be used to store, at a location in a memory of the computer system, a value referenced by the RHS access path.

The access path engine may encounter the instruction while processing a series of instructions of the function (e.g., in a backward manner), starting with an exit point of the function, while attempting to reach an entry point of the function. For example, the exit point may be a return instruction and the entry point may be an instruction that receives input external to the function.

In Step 204, an outgoing access path is determined for the instruction using an incoming access path. The incoming access path may be written as $b.f_1.f_2 \ldots f_n.*$, where b is a variable and $f_1.f_2 \ldots f_n$ is a sequence of fields. When the instruction is a store instruction of the form x.g=y, the access path engine may determine the outgoing access path by performing the following steps:

1) Reify the LHS access path x.g in order to determine the full access path referenced by the LHS access path. When the source code is represented in an intermediate representation (IR) using static single assignment (SSA), instructions involving multiple stores and/or loads may be reified in order to determine the full access path. In one or more embodiments, using SSA, variables represented in the IR may be renamed such that each variable is assigned exactly once, and each variable is defined before it is used. For example, if it is possible to assign a variable x using a value coming from multiple instructions of the source code (e.g., due to conditional branches in the source code), then the variable x may be split into versions that are named $x_1$, $x_2, \ldots x_n$ to correspond with the various ways that x may be assigned a single value (i.e., exactly once). In this way each assignment of the variable x corresponds to its own version $x_i$. In one or more embodiments, requiring that each variable represented be assigned exactly once simplifies the tracing the flow of values among instructions of the source code, since there is a unique path through the source code corresponding to each variable assignment. Translation to an IR usually deconstructs field accesses into multiple sub-instructions using temporary variables that require reification before analysis. To address this issue, a reification step may be performed before processing any store or load instruction, in order to determine the full access path referenced by the load or store statement. The reified LHS access path may have the form $z.g_1.g_2 \ldots g_m.*$.

2) Determine whether the incoming access path matches the reified LHS access path. The incoming access path matches the reified LHS access path when the variable of the incoming access path (e.g., b) and the variable of the reified LHS access path (e.g., z) are the same, and when a prefix (e.g., $f_1.f_2 \ldots f_m$) of the incoming access path matches the field sequence (e.g., $g_1.g_2 \ldots g_m$) of the reified LHS access path.

3) If the incoming access path matches the reified LHS access path, the variable of the outgoing access path is set to the RHS access path (e.g., y) followed by the field sequence of the incoming access path minus the prefix of the incoming access path matching the reified LHS access path. For example, the outgoing access path may be written as $y.f_{m+1} \ldots f_n.*$, where the prefix $f_1.f_2 \ldots f_m$ of the incoming access path matching the reified LHS access path has been removed from the incoming access path.

If any of the stored fields is an array, in addition to propagating an outgoing access path in 3) above (e.g., as $y.f_{m+1} \ldots f_n.*$), the incoming access path is propagated unchanged as a second outgoing access path because the modular analysis is array-insensitive (e.g., the analysis does not analyze the exact array cell that is loaded), and hence cannot invalidate the incoming access path as a potential outgoing access path.

4) If the incoming access path fails to match the reified LHS access path, the access path engine may propagate the incoming access path unchanged (e.g., because the instruction has no impact on the incoming access path). In other words, when the incoming access path fails to match the reified LHS access path, the access path engine may set the outgoing access path to be the incoming access path.

For instructions that do not manipulate the fields of an access path (e.g., instructions that manipulate the variable of the access path without manipulating the fields of an access path), it is unnecessary to apply specializations to the access path because adding additional fields to the access path would also add the same additional fields to the outgoing access path. For example, for an assignment instruction x=y corresponding to the LHS access path (x), the RHS access path (y), and an incoming access path (x.f), the outgoing access path would be (y.f). Similarly, for an incoming access path (x.f.g) the outgoing access path would be (y.f.g) and so on. Thus, given a LHS access path (x.*) the corresponding outgoing access path would be (y.*).

While a load instruction x=y.f does read the fields of an access path, the analysis of the load instruction does not examine the fields of the LHS access path, but instead reproduces the fields of the LHS access path in the outgoing access path, where a matching variable may be replaced by the RHS access path of the load instruction. For example, for the LHS access path (x) the outgoing access path would be (y.f), and for the LHS access path (x.g) the outgoing access path would be (y.f.g), and for the LHS access path (x.g.h) the outgoing access path would be (y.f.g.h), and so on. Thus, given a LHS access path (x.*) the outgoing access path would be (y.f.*).

In Step 206, it is determined that the incoming access path subsumes the LHS access path. The LHS access path may be the reified LHS access path described above in Step 204. An access path $P_1$ subsumes an access path $P_2$ when the following conditions are satisfied:

1) the variable of access path $P_1$ and the variable of access path $P_2$ are the same;

2) the fields of access path $P_1$ are a prefix of the fields of access path $P_2$. The fields of each access path may include the initial fields plus any suffix fields (e.g., suffix fields added by field specializations) of the access path; and 3) the suffix constraints of access path $P_1$ are a subset of the suffix constraints of access path $P_2$. That is, access path $P_2$ is at least as constrained as access path $P_1$. Thus, if access path $P_1$ has no corresponding suffix constraints (i.e., the suffix constraints of access path $P_1$ are the empty set), then condition 3 may be satisfied regardless of the suffix constraints of access path $P_2$. In addition, the additional fields of access path $P_2$ (following the common prefix with access path $P_1$) may not violate the suffix constraints of access path $P_1$ (e.g., otherwise an error may be triggered). For example if a specialization is applied to access path $P_1$ (e.g., to transform access path $P_1$ into access path $P_2$), then checking condition #3 is performed after applying the specialization to access path $P_1$ (e.g., rather than checking condition #3 against the original set of suffix constraints of access path $P_1$).

For example, the incoming access path x.* subsumes the LHS access path x.f because x.* includes x followed by any field (e.g., x.f, x.g, x.h, etc.). As another example, if access path $P_1$ is $b.f_1.f_2.*[+\backslash\{g_1.h_2\}]$ and access path $P_2$ is $b.f_1.f_2.g_1.*[+\backslash\{h_1,h_2\}]$, then access path $P_1$ subsumes access path $P_2$ because:

1) the variables of access path $P_1$ and access path $P_2$ are the same (i.e., the variables of access path $P_1$ and access path $P_2$ are both b);

2) the fields of access path $P_1$ (i.e., $f_1.f_2$) are a prefix of the fields of access path $P_2$ (i.e., $f_1.f_2.g_1.*$);

3) the additional fields of access path $P_2$ (i.e., $g_1$) do not violate the suffix constraint of access path $P_1$ $\{g_1.h_2\}$, because although the suffix constraint includes the field $g_1$, the sequence $g_1.h_2$ is not violated unless the field $h_2$ is subsequently added by another specialization; and 4) specializing access path $P_1$ with the additional fields of access path $P_2$ produces the access path $b.f_1.f_2.g_1.*[+\backslash\{h_2\}]$, whose suffix constraints $[+\backslash\{h_2\}]$ are a subset of the suffix constraints $[+\backslash\{h_1,h_2\}]$ of access path $P_2$.

In Step 208, a specialized outgoing access path is generated by appending a field of the LHS access path to the outgoing access path. The presence of the wildcard symbol '*' as a suffix of an access path means that an access path encompasses many specific access paths with different combinations of additional fields as suffixes. And because the incoming access path subsumes (i.e., is more general than) the LHS access path, the incoming access path includes specific access paths that match the LHS access path (Case 1) and also includes specific access paths that fail to match the LHS access path (Case 2). Case 1 and Case 2 represent two distinct, non-overlapping access path flows through the instruction.

Case 1 corresponds to specific incoming access paths that match the LHS access path and are thus affected by the instruction. To handle Case 1, the access path engine generates a specialized outgoing access path by applying a field specialization that appends one or more fields of the LHS access path to the outgoing access path so that the specialized outgoing access path matches the LHS access path. For example, if the instruction is a store instruction x.f=y and the outgoing access path is (x.*), the access path engine adds the field f of the LHS access path x.f and generates the specialized outgoing access path ((y.*), [+.f]) (where the RHS access path y replaces the variable x as described in #3 of Step 204 above).

Case 2 corresponds to specific incoming access paths that fail to match the LHS access path and are thus unaffected by the instruction. To handle Case 2, the access path engine generates a specialized outgoing access path by applying a constraint specialization that adds a suffix constraint to the outgoing access path that excludes the field added in Case 1 above. Continuing the above example, the access path engine adds the suffix constraint [+\{f}]) and generates the specialized outgoing access path (x.*[+\{f}]).

In Step 210, it is determined, using the specialized outgoing access path, that an entry access path of the function is reachable from an exit access path of the function. The access path engine may also apply the specialization to the exit access path, essentially narrowing the scope of access path flows passing through the function (also see description of Step 264 below). The access path engine may continue processing instructions of the function using the specialized outgoing access path. For example, in Case 1 of Step 208 above, the specialized outgoing access path with the field specialization may be the incoming access path for one or more subsequently processed instructions of the function. Similarly, in Case 2 of Step 208 above, the specialized outgoing access path with the constraint specialization may be the incoming access path for one or more subsequently processed instructions of the function. While continuing to process the instructions of the function, the access path engine may reach an instruction corresponding to an entry access path of the function.

In Step 212, a potential taint flow from the entry access path to the exit access path is identified. The access path engine may generate a security alert in response to identifying the potential taint flow. The access path engine may identify the potential taint flow when two conditions are satisfied:

1) the entry access path corresponds to a taint source. For example, the taint source may be input received from a user or a source external to the function. As another example, the taint source may be input received from a function that is a known taint source included in a list of known taint sources; and 2) the exit access path corresponds to a security-sensitive operation. The security-sensitive operation may access a security-sensitive resource of the computer system. The security-sensitive operation may be included in a list of known security-sensitive operations.

In one or more embodiments, the list of known taint sources and known security-sensitive operations may be part of a taint configuration defined by a user.

In Step 214, a summary including a summary edge between the exit access path and the entry access path is generated for the function. The access path engine may create a summary edge between the exit access path and each entry access path reachable from the exit access path by executing the process of FIG. 2A. The exit access path and the entry access path may include field specializations and/or constraint specializations.

Figure 2B:
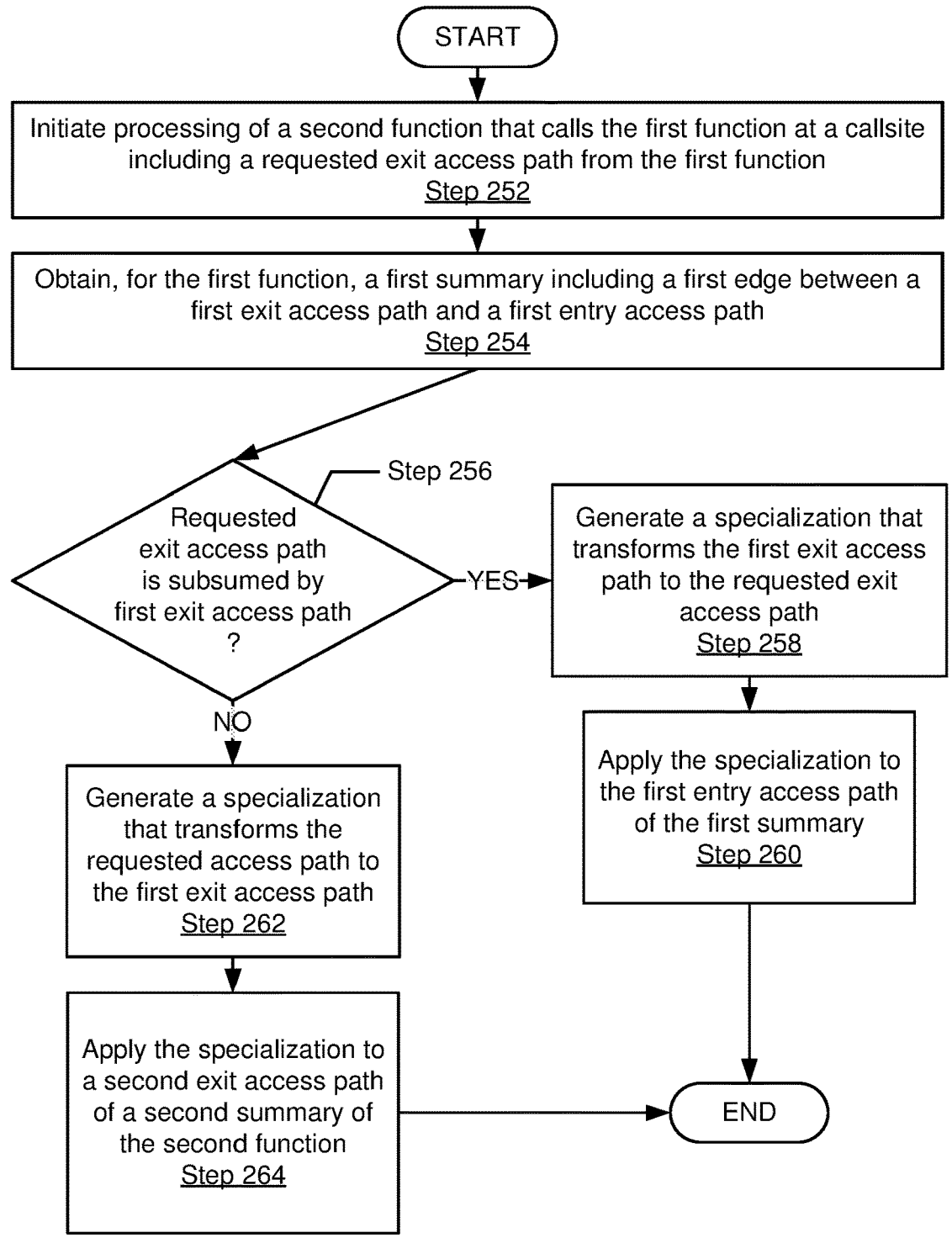

FIG. 2B shows a flowchart in accordance with one or more embodiments of the invention. The flowchart depicts a process for performing a modular taint analysis with access paths. One or more of the steps in FIG. 2B may be performed by the components (e.g., the access path engine (104) of the system (100)), discussed above in reference to FIG. 1A. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, processing is initiated of a second function in source code that calls a first function in the source code. The second function calls the first function at a callsite that includes a requested exit access path from the first function. For example, the requested exit access path may reference a return value of the first function.

In Step 254, a first summary of the first function is obtained. The first summary includes a summary edge between a first exit access path and a first entry access path (see description of Step 214 above). The first summary may be obtained from a repository (e.g., using a function identifier (ID) of the first function). In one or more embodiments, the access path engine applies the first summary (e.g., using the IFDS algorithm), by mapping the LHS access path at the callsite into the context of the first (i.e., callee) function, where the LHS access path becomes an exit access path of the first function. The summary edges for the exit access path of the first function may then be computed. Alternatively, the summary edges for the exit access path of the first function may be retrieved (e.g., from a repository) if the summary edges have been computed already. The entry access paths from the summary edges may then be mapped into the context of the second (i.e., caller) function, becoming RHS access paths at the callsite, at which point the modular taint analysis continues in the second function. There are several possible relationships between the requested exit access path and the first exit access path, as described below.

If, in Step 256 it is determined that the requested exit access path is subsumed by the first exit access path (i.e., the first exit access path is more general than the requested exit access path), then Step 258 and Step 260 below are executed. Otherwise, if Step 256 determines that the requested exit access path subsumes the first exit access path, then Step 262 and Step 264 access path are executed. Still otherwise, if Step 256 determines that the requested exit access path and the first exit access path are the same, then the first entry access path may be used as-is (i.e., without applying a specialization to the first entry access path or to the requested exit access path). Finally, if Step 256 determines that the requested exit access path fails to match the first exit access path (e.g., the requested exit access path is neither equal to, nor strictly subsumes, nor is strictly subsumed by the first exit access path), the access path engine may ignore the summary edge as irrelevant.

In Step 258, a specialization that transforms the first exit access path to the requested exit access path is generated. The specialization may include the following:

1) a field specialization that adds any fields that are present in the requested exit access path but not the first exit access path, beyond a prefix common to both the requested exit access path and the first exit access path; and/or 2) a constraint specialization that adds any suffix constraints present in the requested exit access path but not the first exit access path (e.g., after applying the field specialization generated in 1) above to the first exit access path).

In Step 260, the specialization is applied to the first entry access path of the first summary. For example, the requested exit access path may be (x.f.g.*), and the summary edge of the first function may be ((x.f*)←(arg.*)). In this case the requested exit access path is subsumed by the first (e.g., summary) exit access path, so the requested exit access path and the first exit access path are compared to produce the specialization [+.g], which may then be applied to the first (e.g., summary) entry access path (arg.*) to produce the entry access path (arg.g.*). Essentially, the access path engine may process a requested access path that is more specific than the summary exit access path by specializing the summary to match the requested access path, which in this example would be the summary edge ((x.f.g.*)← (arg.g.*)). Then, the access path engine may apply the specialized summary edge as in the case where both the requested exit access path and the first exit access path match.

In Step 262, a specialization that transforms the requested exit access path to the first exit access path is generated (see description of Step 258 above). Thus, the first summary may apply to only a subset of the access paths represented by the requested exit access path. The specialization may include the following:

1) a field specialization that adds any fields that are present in the first exit access path but not the requested exit access path, beyond a prefix common to both the requested exit access path and the first exit access path; and/or 2) a constraint specialization that adds any suffix constraints present in the first exit access path but not the requested exit access path (e.g., after applying the field specialization generated in 1) above to the requested exit access path).

In Step 264, the specialization is applied to the second exit access path of the second summary of the second function (i.e., the function that calls the first function), essentially narrowing the scope of further analysis of flows passing through the summary edge of the second function. Unlike the case of the store instruction (see description of Step 204 above), the flow may not be split into two flows to cover the non-matching case, because the non-matching case may be handled by other summary edges in the summary of the first (i.e., callee) function. For example, the requested exit access path may be (x.f*) and the first (e.g., summary) edge may be ((x.f.g.*)←(arg.*)), with the backward flow originating from the second (e.g., the caller) function exit access path (<ret>.*). In this case, the first exit access path is subsumed by the requested exit access path, so the entry access path used may be (arg.*), and the requested and first exit access paths are compared to produce the specialization [+.g], which is recorded such that when the final summaries produced as a result of the flow through this summary edge are generated, the final summaries may be applied to the caller function's exit access path (which in this case produces (<ret>.g.*) if there are no further specializations).

Figure 3:
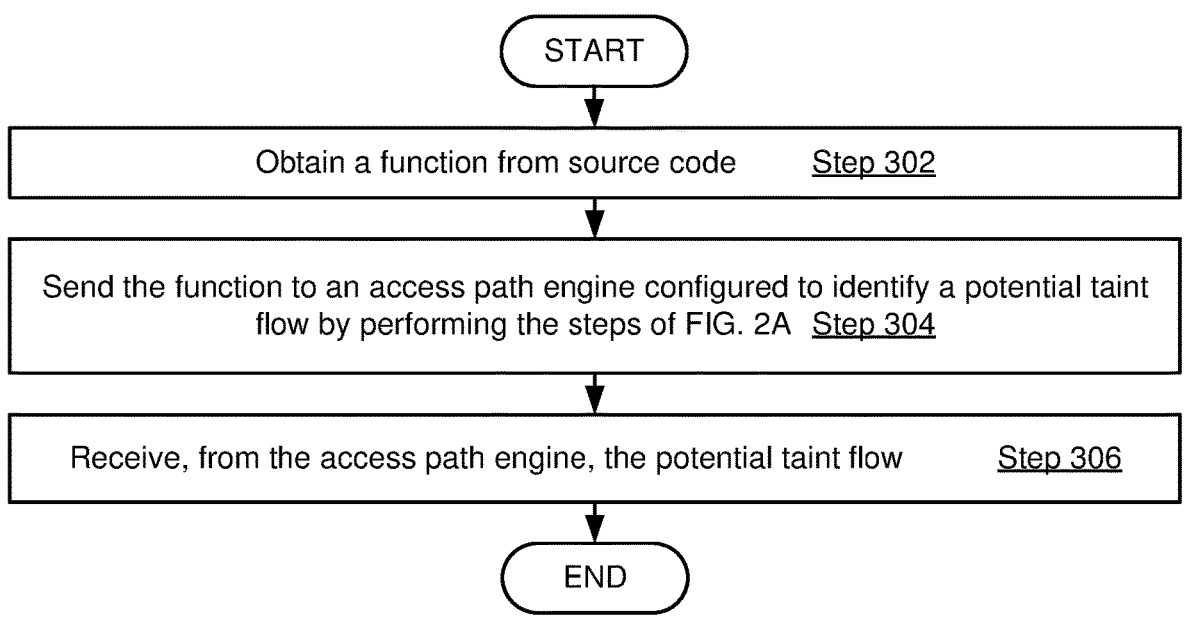

FIG. 3 shows a flowchart in accordance with one or more embodiments of the invention. The flowchart depicts a process for performing a modular taint analysis with access paths. One or more of the steps in FIG. 3 may be performed by the components (e.g., the access path engine (104) of the system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, a function is obtained from source code. The source code may be obtained from a repository.

In Step 304, the function is sent to an access path engine configured to identify a potential taint flow by performing the steps of FIG. 2A. The function may be sent to the access path engine via a network (e.g., network (520) of FIG. 5B).

In Step 306, the potential taint flow is received from the access path engine. The potential taint flow may be received from the access path engine via the network.

Figure 4A:
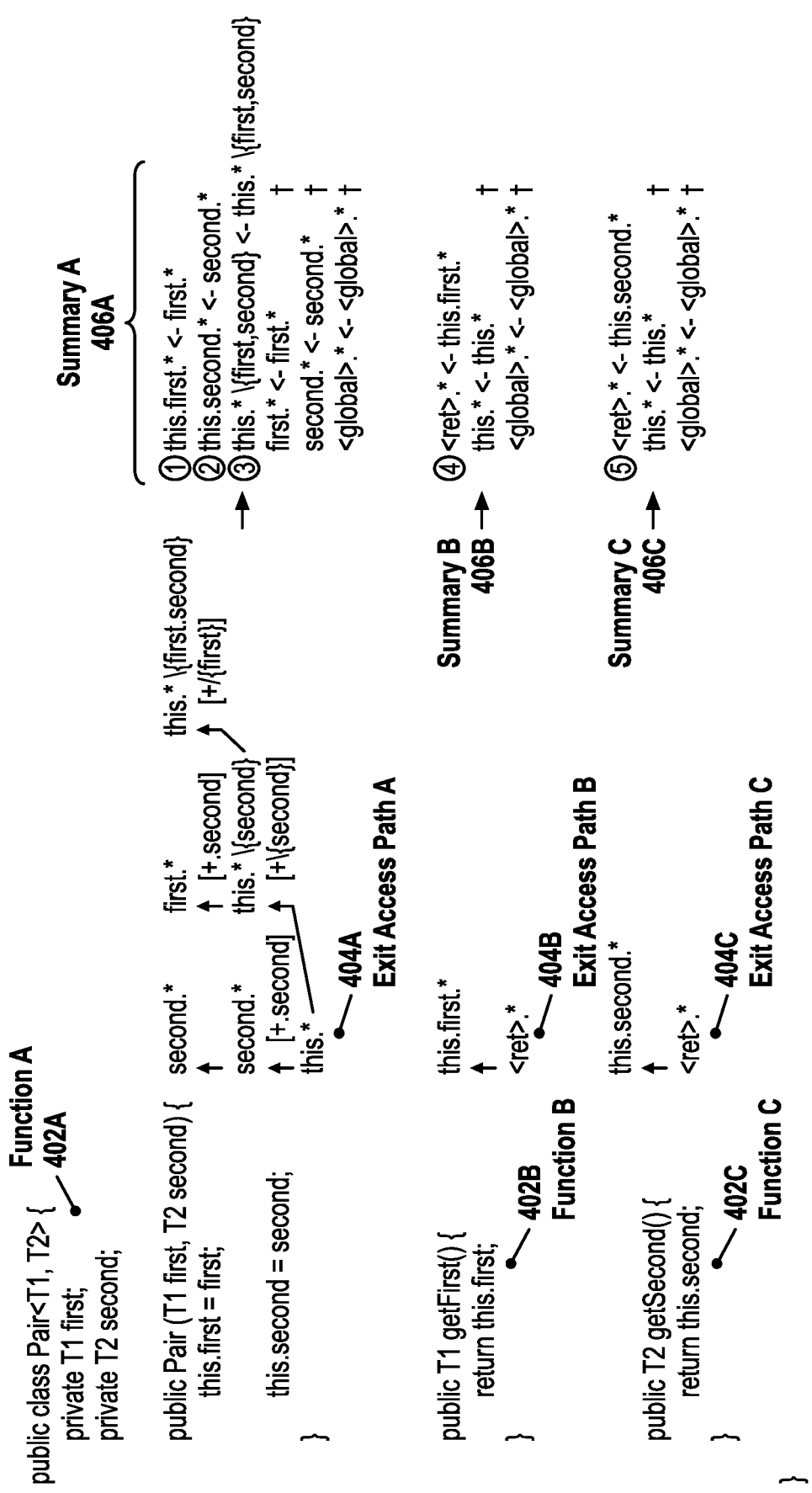
FIG. 4A, FIG. 4B, and FIG. 4C show examples in accordance with one or more embodiments of the invention.
Figure 4B:
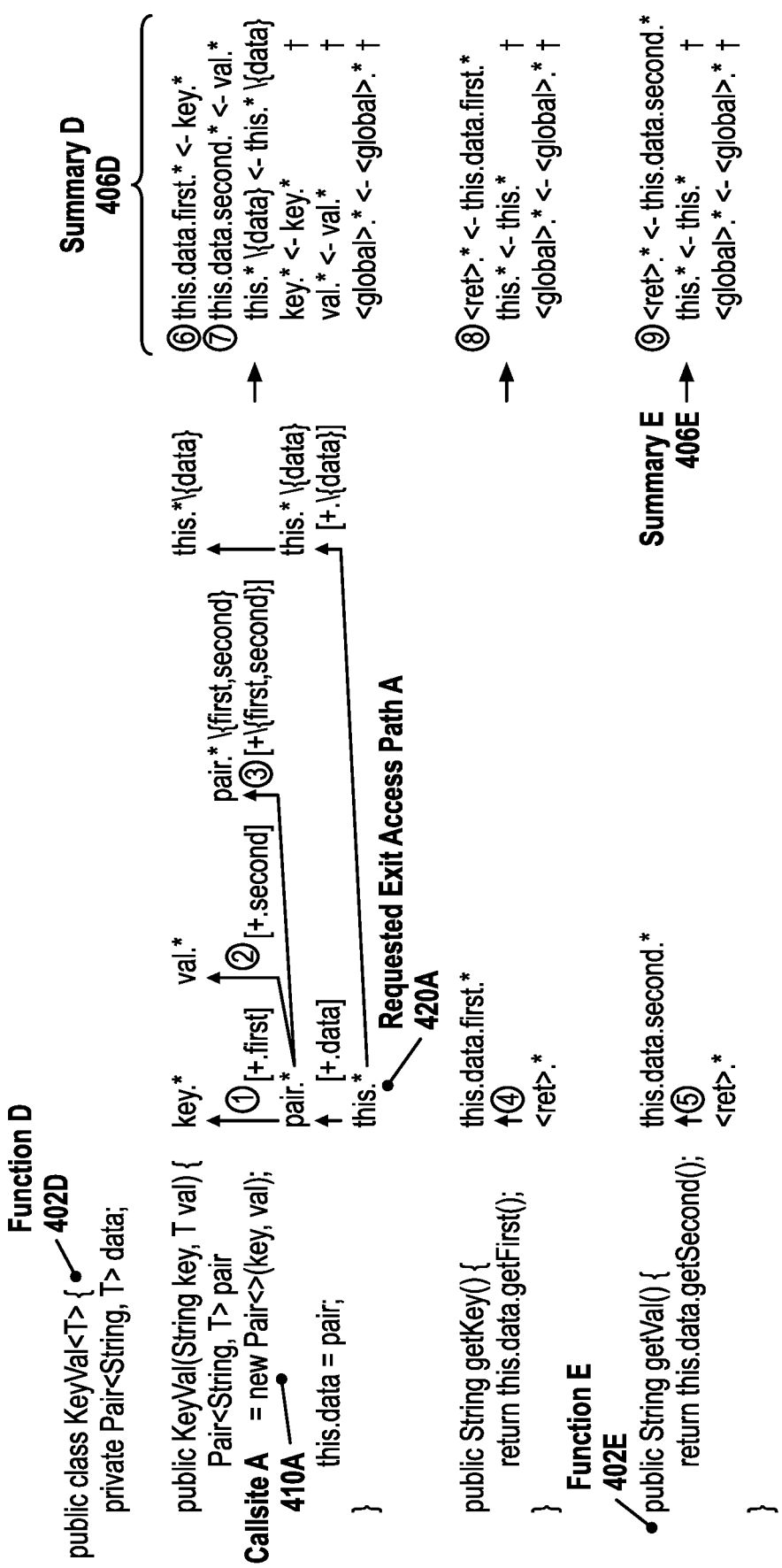
Figure 4C:
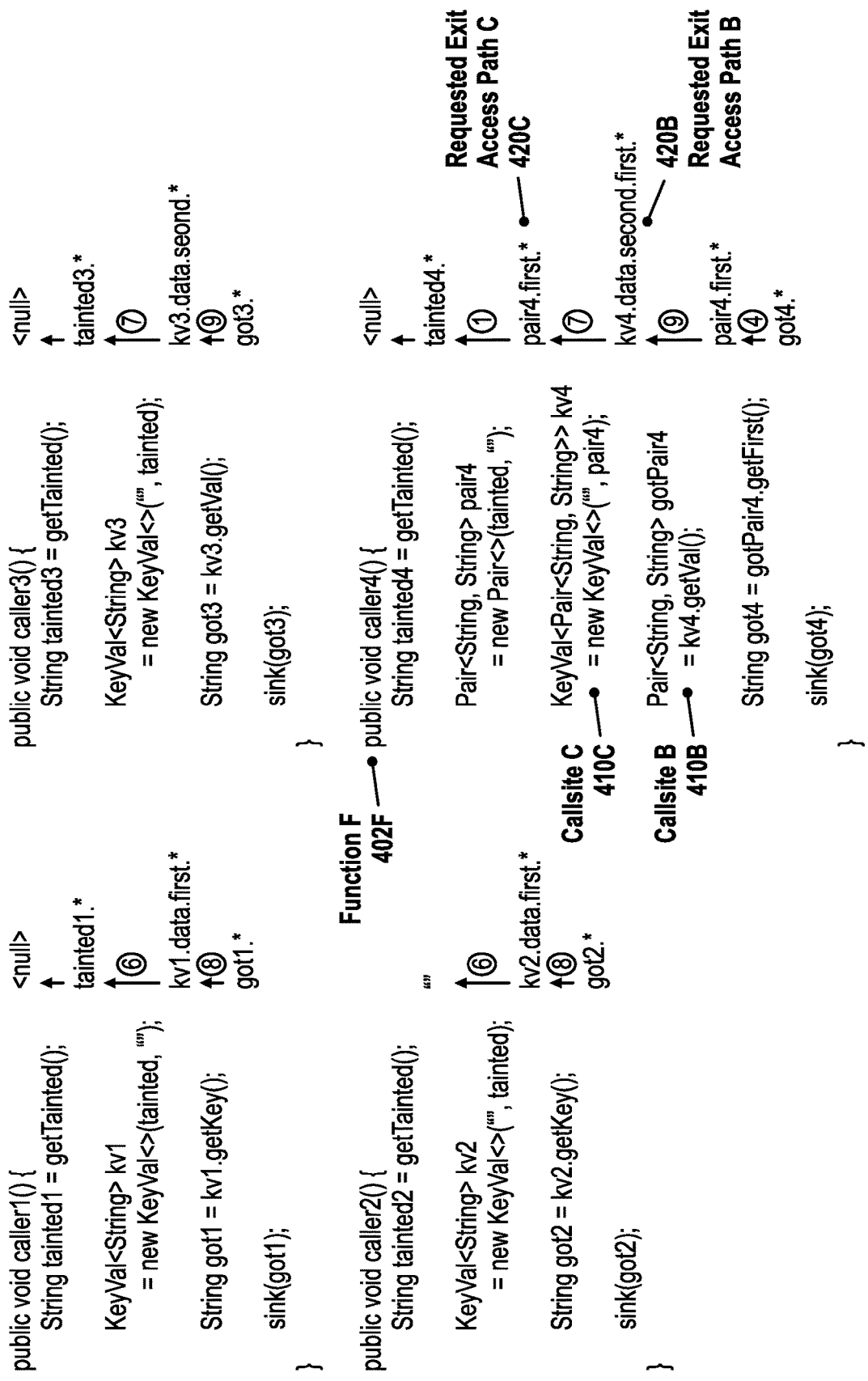

FIG. 4A, FIG. 4B, and FIG. 4C show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 4A shows summaries (406A, 406B, 406C) ((140S, 140Y) in FIG. 1A) generated for functions (402A, 402B, 402C) ((112F, 112M) in FIG. 1A). The access path engine begins its analysis of function A (402A), the Pair constructor, starting with exit access path A (404A), this.*, which corresponds to the return value of function A (402A). Traversing backwards through the instructions of function A (402A), the access path engine then examines the store instruction this.second=second, the last instruction of function A (402A). The store instruction corresponds to a LHS access path this.second.* and a RHS access path second.*. The incoming access path at the store instruction this.second=second is the exit access path A (404A), this.*. The exit access path A (404A) partially matches the LHS access path this.second.*, so the access path engine generates the following two outgoing access paths and specializations, as shown in FIG. 4A:

1) Case 1—exit access path A (404A), this.* matches (e.g., subsumes) the LHS access path this.second.* of the store instruction, so the access path engine generates the outgoing access path (second.*), [+.second]); and 2) Case 1—exit access path A (404A), this.* fails to match the LHS access path this.second.* of the store instruction, so the access path engine generates the outgoing access path (this.*\{second}), [+\{second}]).

The access path engine then continues the analysis with each of the above outgoing access paths individually, which become incoming access paths for subsequently analyzed instructions. The analysis examines the store instruction this.first=first for the incoming access path (second.*), which fails to match the LHS access path this.first.* of the store instruction and thus is propagated unchanged (i.e., the store instruction this.first=first has no impact on the incoming access path). The access path engine also examines the same store instruction this.first=first for the other incoming access path (this.*\{second}), which partially matches the LHS access path this.first.* of the store instruction, so the access path engine generates two additional outgoing access paths and specializations, as shown in FIG. 4A: ((first.*), [+.first]) and ((this.*\{first, second}), [+\{first}]).

At this point the access path engine has finished propagating access paths and thus generates summary edges from the access paths that reached the start of function A (402A), specializing the original exit access path A (404A) for each outgoing access path using the specializations collected along the flow path. For the access path (second.*), the access path engine applies the previously-generated specialization [+.second] to the original exit access path (this.*), thus generating the summary edge (this.second.*)←(second.*), as shown in summary A (406A). For the access path (first.*), the access path engine applies the previously-generated specialization [+.first] to the original exit access path (this.*), generating the summary edge (this.first.*)← (first.*), as shown in summary A (406A). For the access path (this.* \{first, second}). the access path engine applies the two previously-collected specializations [+\{second}] and [+\{first}] to the original exit access path (404A) (this.*), generating the summary edge (this.*\{first, second})←(this.*\{first, second}).

Thus, the three summary edges generated from the analysis of the exit access path (404A) (this.*) are: (this.first.*)←(first.*), (this.second.*)←(second.*), and (this.*\{first, second})←(this.*\{first, second}), which represent the behavior of function A (402A) for all access paths subsumed by the exit access path (404A) (this.*) (i.e., all access paths beginning with this). In other words, all access paths stemming from this.first flow from the access path corresponding to the argument first, all access paths stemming from this.second flow from the access path corresponding to the argument second, and all other access paths stemming from this remain unaffected by function A (402A).

In addition, summary A (406A) includes the summary edges (first.*)←(first.*)), ((second.*)←(second.*) and (<global>.*)←(<global>.*), which indicate that function A (402A) does not modify either of its arguments, and does not modify any global variables.

The access path engine also generates summary B (406B) for function B (402B), the getFirst function. Function B (402B) includes a single load instruction that returns this.first. Because exit access path B (404B) ret.* of function B (402B) corresponds to a load instruction, exit access path (404B) does not require specialization. Thus, summary B (406B) includes the summary edge ret.*←this.first.*, indicating that function B (402B) returns its input argument this.first. Similarly, the access path engine generates summary C (406C) for function C (402C), the getSecond function. Function C (402C) includes a single load instruction that returns its input argument this.second. Because exit access path C (404C) ret.* of function C (402C) corresponds to a load instruction, exit access path C (404C) does not require specialization. Thus, summary C (406C) includes the summary edge ret.*← this. second.*, indicating that function C (402C) returns its input argument this. second.

FIG. 4B shows function D (402D), the KeyVal constructor, and corresponding summary D (406D). FIG. 4B also shows function E (402E), the getVal function, and corresponding summary E (406E). The access path engine applies the summaries of functions called at callsites encountered as the access path engine analyzes the instructions shown in FIG. 4B. In most cases, the requested exit access path at the callsite is the same as the summary exit access path in the callee function, in which case the entry access path from the callee summary is mapped into the context of the caller function, becoming a RHS access path at the callsite, as described in Step 254 above, such that neither the entry access path nor the requested exit access path requires specialization.

However, when the access path engine reaches callsite A (410A) in function D (402D) where function A (402A) (i.e., the Pair constructor of FIG. 4A) is called, the access path engine determines that the requested exit access path (420A) this.* subsumes (i.e., is more general than) the exit access paths this.first.* and this.second.*, labeled "1" and "2", respectively, in summary A (406A) (i.e., the summary of the Pair constructor). Prior to reaching callsite A (410A) in function D (402D), the access path engine processed the store instruction this.data=pair (the last instruction in function D (402D)), resulting in recording the specialization [+.data] on the requested exit access path (420A) this.*. After applying the specialization [+.data] to the requested exit access path (420A) this.*, the access path engine then applies, at labels "1" and "2" in FIG. 4B, the specializations [+.first] and [+.second], resulting in the further specialized exit access paths (this.data.first.*) and (this.data.second.*). The access path engine also specializes the requested exit access path (420A) this.data.* into the access path (this.data.*\{first, second}), as indicated by label "3" in FIG. 4B. However, the access path (this.data.*\{first, second}) does not result in a summary edge because the flow terminates before reaching an entry access path of function D (402D) (i.e., the flow terminates at the creation of the pair variable, which is not an entry access path, and thus was not propagated any further).

FIG. 4C shows a function F (402F), the caller4 function. When the access path engine reaches callsite B (410B) in function F (402F), where function E (402E) (the getVal function of FIG. 4B) is called, the access path engine determines that requested exit access path B (420B) kv4.data.second.first.* is subsumed by (i.e., is more specific than) the exit access path this.data.second.* in summary E (406E) (i.e., the summary of the getVal function). The access path engine then specializes the exit access path this.data..second in summary E (406E) to match requested exit access path B (420B) by applying a field specialization that appends the field first to the exit access path of summary E (406E). Similarly, when the access path engine reaches callsite C (410C) in function F (406F), where function D (402D) (the Pair constructor of FIG. 4B) is called, the access path engine determines that requested exit access path C (420C) pair4.first is subsumed by the exit access path this.data.second in summary D (406D) (i.e., the summary of the Pair constructor). The access path engine then specializes the exit access path this.data.second in summary D (406D) to match requested exit access path C (420C) by applying a field specialization that appends the field first to the exit access path of summary D (406D).

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
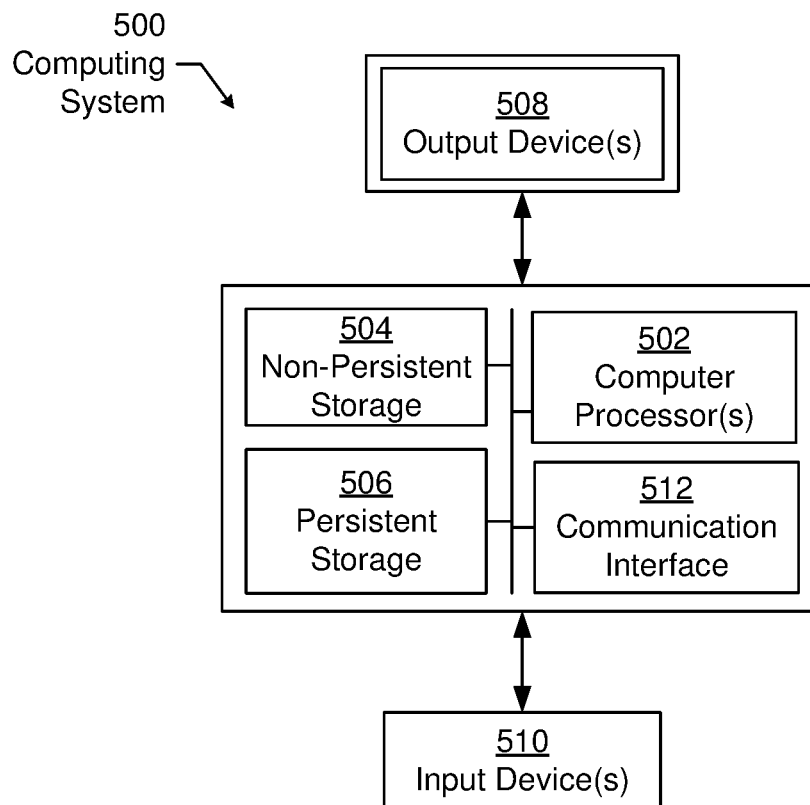
FIG. 5A and FIG. 5B show computing systems in accordance with one or more embodiments of the invention.
Figure 5B:
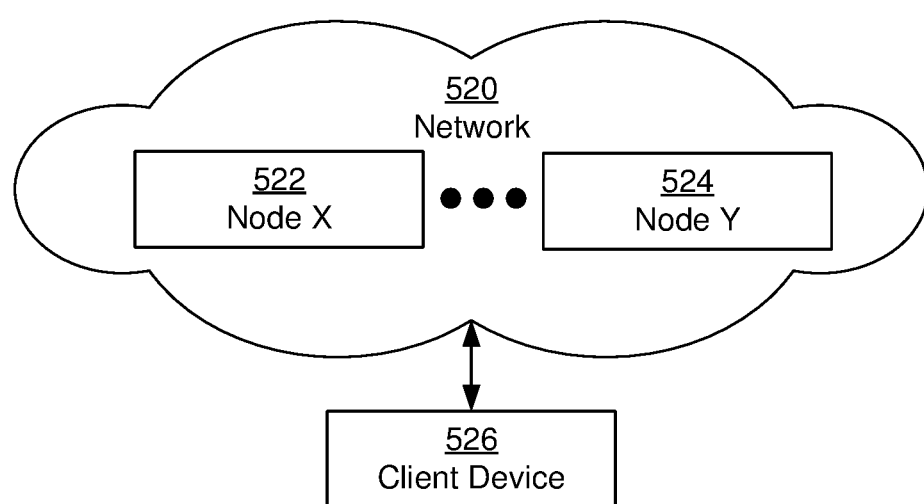

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   extracting, from an instruction of a first function in source code, (i) a left-hand side (LHS) access path comprising a first variable and a first sequence of fields and (ii) a right-hand side (RHS) access path comprising a second variable and a second sequence of fields;
   determining, using an incoming access path, an outgoing access path for the instruction;
   determining that the incoming access path subsumes the LHS access path;
   in response to determining that the incoming access path subsumes the LHS access path, generating a first specialized outgoing access path by appending a field of the LHS access path to the outgoing access path;
   determining, using the first specialized outgoing access path, that a first entry access path of the first function is reachable from a first exit access path of the first function; and
   in response to determining that the first entry access path is reachable from the first exit access path, identifying a potential taint flow from the first entry access path to the first exit access path.

2. The method of claim 1, further comprising:
   generating a second specialized outgoing access path by adding, to the outgoing access path, a suffix constraint that excludes the field of the LHS access path.

3. The method of claim 1, wherein the LHS access path further comprises first suffix constraints, wherein the incoming access path comprises a third variable, a third sequence of fields, and second suffix constraints, and wherein determining that the incoming access path subsumes the LHS access path comprises:

determining that the second variable and the third variable are the same;
   determining that the third sequence of fields is a prefix of the second sequence of fields; and
   determining that the second suffix constraints are a subset of the first suffix constraints.

4. The method of claim 1, further comprising:
   generating, for the first function, a first summary comprising a first summary edge between the first exit access path and the first entry access path;
   initiating processing of a second function in the source code that calls the first function at a callsite comprising a requested exit access path from the first function;
   obtaining the first summary of the first function;
   determining that the requested exit access path is subsumed by the first exit access path;
   in response to determining that the requested exit access path is subsumed by the first exit access path, generating a specialization that transforms the first exit access path to the requested exit access path; and
   applying the specialization to the first entry access path of the first summary.

5. The method of claim 4, wherein applying the specialization to the first entry access path adds, to the first entry access path, one of at least one field and at least one suffix constraint.

6. The method of claim 1, further comprising:
   generating, for the first function, a summary comprising a first summary edge between the first exit access path and the first entry access path;
   initiating processing of a second function in the source code that calls the first function at a callsite comprising a requested exit access path from the first function, wherein the second function corresponds to a second summary comprising a second summary edge between a second exit access path and a second entry access path;
   obtaining the first summary of the first function;
   determining that the requested exit access path subsumes the first exit access path;
   in response to determining that the requested exit access path subsumes the first exit access path, generating a specialization that transforms the requested exit access path to the first exit access path; and
   applying the specialization to the second exit access path of the second summary.

7. The method of claim 1, wherein the first entry access path comprises a suffix constraint that excludes at least one field from the first entry access path.

8. A system comprising:
   a computer processor;
   a repository configured to store source code comprising a first function, wherein the first function comprises an instruction comprising (i) a left-hand side (LHS) access path comprising a first variable and a first sequence of fields and (ii) a right-hand side (RHS) access path comprising a second variable and a second sequence of fields; and
   an access path engine, executing on the computer processor and configured to:
   extract, from the instruction, the LHS access path and the RHS access path,
   determine, using an incoming access path, an outgoing access path for the instruction,
   determine that the incoming access path subsumes the LHS access path, in response to determining that the incoming access path subsumes the LHS access path, generate a first specialized outgoing access path by appending a field of the LHS access path to the outgoing access path, determine, using the first specialized outgoing access path, that a first entry access path of the first function is reachable from a first exit access path of the first function, and in response to determining that the first entry access path is reachable from the first exit access path, identify a potential taint flow from the first entry access path to the first exit access path.

9. The system of claim 8, wherein the access path engine is further configured to:

generate a second specialized outgoing access path by adding, to the outgoing access path, a suffix constraint that excludes the field of the LHS access path.

10. The system of claim 8, wherein the LHS access path further comprises first suffix constraints, wherein the incoming access path comprises a third variable, a third sequence of fields, and second suffix constraints, and wherein the access path engine is further configured to determine that the incoming access path subsumes the LHS access path by:

determining that the second variable and the third variable are the same, determining that the third sequence of fields is a prefix of the second sequence of fields, and determining that the second suffix constraints are a subset of the first suffix constraints.

11. The system of claim 8, wherein the access path engine is further configured to:

generate, for the first function, a first summary comprising a first summary edge between the first exit access path and the first entry access path, initiate processing of a second function in the source code that calls the first function at a callsite comprising a requested exit access path from the first function, obtain the first summary of the first function, determine that the requested exit access path is subsumed by the first exit access path, in response to determining that the requested exit access path is subsumed by the first exit access path, generate a specialization that transforms the first exit access path to the requested exit access path, and apply the specialization to the first entry access path of the first summary.

12. The system of claim 11, wherein the access path engine is further configured to apply the specialization to the first entry access path by adding, to the first entry access path, one of at least one field and at least one suffix constraint.

13. The system of claim 8, wherein the access path engine is further configured to:

generate, for the first function, a first summary comprising a first summary edge between the first exit access path and the first entry access path, initiate processing of a second function in the source code that calls the first function at a callsite comprising a requested exit access path from the first function, wherein the second function corresponds to a second summary comprising a second summary edge between a second exit access path and a second entry access path, obtain the first summary of the first function, determine that the requested exit access path subsumes the first exit access path, in response to determining that the requested exit access path subsumes the first exit access path, generate a specialization that transforms the requested exit access path to the first exit access path, and apply the specialization to the second exit access path of the second summary.

14. The system of claim 8, wherein the first entry access path comprises a suffix constraint that excludes at least one field from the first entry access path.

15. A method comprising:

obtaining a first function from source code;

sending the first function to an access path engine configured to identify a potential taint flow by:

extracting, from an instruction of the first function, (i) a left-hand side (LHS) access path comprising a first variable and a first sequence of fields and (ii) a right-hand side (RHS) access path comprising a second variable and a second sequence of fields, determining, using an incoming access path, an outgoing access path for the instruction, determining that the incoming access path subsumes the LHS access path, in response to determining that the incoming access path subsumes the LHS access path, generating a first specialized outgoing access path by appending a field of the LHS access path to the outgoing access path, determining, using the first specialized outgoing access path, that a first entry access path of the first function is reachable from a first exit access path of the first function, and in response to determining that the first entry access path is reachable from the first exit access path, identifying a potential taint flow from the first entry access path to the first exit access path; and receiving, from the access path engine, the potential taint flow.

16. The method of claim 15, wherein the access path engine is further configured to:

generate a second specialized outgoing access path by adding, to the outgoing access path, a suffix constraint that excludes the field of the LHS access path.

17. The method of claim 15, wherein the LHS access path further comprises first suffix constraints, wherein the incoming access path comprises a third variable, a third sequence of fields, and second suffix constraints, and wherein determining that the incoming access path subsumes the LHS access path comprises:

determining that the second variable and the third variable are the same;

determining that the third sequence of fields is a prefix of the second sequence of fields; and determining that the second suffix constraints are a subset of the first suffix constraints.

18. The method of claim 15, wherein the access path engine is further configured to:

generate, for the first function, a first summary comprising a first summary edge between the first exit access path and the first entry access path;

initiate processing of a second function in the source code that calls the first function at a callsite comprising a requested exit access path from the first function;

obtain the first summary of the first function;

determine that the requested exit access path is subsumed by the first exit access path;

in response to determining that the requested exit access path is subsumed by the first exit access path, generate a specialization that transforms the first exit access path to the requested exit access path; and apply the specialization to the first entry access path of the first summary.

19. The method of claim 18, wherein applying the specialization to the first entry access path adds, to the first entry access path, one of at least one field and at least one suffix constraint.

20. The method of claim 15, wherein the access path engine is further configured to:
  generate, for the first function, a summary comprising a first summary edge between the first exit access path and the first entry access path;
  initiate processing of a second function in the source code that calls the first function at a callsite comprising a requested exit access path from the first function, wherein the second function corresponds to a second summary comprising a second summary edge between a second exit access path and a second entry access path;
  obtain the first summary of the first function;
  determine that the requested exit access path subsumes the first exit access path;
  in response to determining that the requested exit access path subsumes the first exit access path, generate a specialization that transforms the requested exit access path to the first exit access path; and
  apply the specialization to the second exit access path of the second summary.

* * * * *

UNITED STATES PATENT AND TRADEMARK OFFICE
CERTIFICATE OF CORRECTION

PATENT NO. : 11,568,060 B2
APPLICATION NO. : 17/115574
DATED : January 31, 2023
INVENTOR(S) : Nicholas John Allen It is certified that error appears in the above-identified patent and that said Letters Patent is hereby corrected as shown below:

On the Title Page

On page 2, Column 2, item (56) under Other Publications, Line 16, delete ""UFA:" and insert -- "IIFA: --, therefor.

In the Specification

In Column 5, Line 32, delete "(1408)" and insert -- (140S) --, therefor.

In Column 5, Line 33, delete "(1408)" and insert -- (140S) --, therefor.

In Column 6, Line 25, delete "am" and insert -- are --, therefor.

In Column 11, Line 40, delete "(x.f*)" and insert -- (x.f.*) --, therefor.

Signed and Sealed this
Nineteenth Day of December, 2023

Katherine Kelly Vidal
*Director of the United States Patent and Trademark Office*